United States Patent
Wegmann et al.

(10) Patent No.: US 9,107,096 B2
(45) Date of Patent: Aug. 11, 2015

(54) RADIO ACCESS PARAMETER TUNING

(75) Inventors: Bernhard Wegmann, Holzkirchen (DE); Frank Frederiksen, Klarup (DK); Jeroen Wigard, Klarup (DK); Ingo Viering, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 166 days.

(21) Appl. No.: 13/821,263

(22) PCT Filed: Sep. 8, 2010

(86) PCT No.: PCT/EP2010/063190
§ 371 (c)(1),
(2), (4) Date: Mar. 25, 2013

(87) PCT Pub. No.: WO2012/031626
PCT Pub. Date: Mar. 15, 2012

(65) Prior Publication Data
US 2013/0194915 A1  Aug. 1, 2013

(51) Int. Cl.
*H04W 24/04* (2009.01)
*H04W 36/00* (2009.01)
*H04W 24/02* (2009.01)
*H04W 76/04* (2009.01)

(52) U.S. Cl.
CPC .......... *H04W 24/04* (2013.01); *H04W 36/0083* (2013.01); *H04W 24/02* (2013.01); *H04W 76/045* (2013.01)

(58) Field of Classification Search
CPC . H04W 24/04; H04W 36/0083; H04W 24/02; H04W 76/045
USPC .................................. 370/228, 242, 244, 331
See application file for complete search history.

(56) References Cited

U.S. PATENT DOCUMENTS

| | | | |
|---|---|---|---|
| 8,144,664 B2 * | 3/2012 | Pani et al. | 370/331 |
| 8,233,897 B2 * | 7/2012 | Poston | 455/422.1 |
| 8,301,156 B2 * | 10/2012 | del Rio-Romero et al. | 455/453 |
| 2004/0252699 A1 * | 12/2004 | Drevon et al. | 370/395.21 |
| 2008/0070587 A1 * | 3/2008 | Hirvonen et al. | 455/453 |
| 2008/0182594 A1 * | 7/2008 | Flore et al. | 455/458 |
| 2009/0043789 A1 * | 2/2009 | Gupta | 707/100 |
| 2009/0245203 A1 * | 10/2009 | Pani et al. | 370/331 |
| 2010/0232391 A1 * | 9/2010 | Olsson et al. | 370/331 |

FOREIGN PATENT DOCUMENTS

| | | |
|---|---|---|
| EP | 1 988 727 A1 | 11/2008 |
| EP | 2 166 796 A1 | 3/2010 |

OTHER PUBLICATIONS

R2-074317, 3GPP TSG RAN WG2#59bis, Oct. 8-12, 2007, Shanghai, China, "Intra-frequency reporting events", Norte 5 pgs.

* cited by examiner

*Primary Examiner* — Brian D Nguyen
(74) *Attorney, Agent, or Firm* — Harrington & Smith (57) ABSTRACT

There is provided a solution for performing radio access parameter tuning. The solution includes obtaining first predetermined characteristics related to users who experienced a radio link failure, obtaining second predetermined characteristics related to the users who are according to a predetermined rule prone to a radio link failure, and determining, based on the obtained second predetermined characteristics in addition to the obtained first predetermined characteristics, whether radio access parameter tuning is to be performed or not.

24 Claims, 3 Drawing Sheets

RADIO ACCESS PARAMETER TUNING

FIELD

The invention relates generally to mobile communication networks. More particularly, the invention relates to tuning of radio access parameters.

BACKGROUND

In radio communication networks, such as the Long Term Evolution (LTE) or the LTE-Advanced (LTE-A) of the 3$^{rd}$ Generation Partnership Project (3GPP), network planning comprises the use of base stations (Node B, evolved NB). The eNB typically provides radio coverage for a certain geographical area and performs radio access related activities such as handover management for user equipments (UE).

In order for the UE to communicate with eNB, there needs to be a radio link between the UE and the eNB. However, it may occur that the radio connection is lost or failed such that the UE looses connection to the eNB. Avoiding or at least mitigating the connection failures may require radio access parameter tuning. Thus, it is important to provide a solution for an efficient radio access parameter tuning.

BRIEF DESCRIPTION OF THE INVENTION

Embodiments seek to improve the radio access parameter tuning in a radio communication network.

According to an aspect of the invention, there is provided a method as specified in claim 1.

According to an aspect of the invention, there are provided apparatuses as specified in claims 12 and 23.

According to an aspect of the invention, there is provided a computer program product as specified in claim 24.

Embodiments of the invention are defined in the dependent claims.

LIST OF DRAWINGS

In the following, the invention will be described in greater detail with reference to the embodiments and the accompanying drawings, in which.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Radio communication networks, such as the Long Term Evolution (LTE) or the LTE-Advanced (LTE-A) of the 3$^{rd}$ Generation Partnership Project (3GPP), are typically composed of at least one base station (also called a base transceiver station, a Node B, or an evolved Node B, for example), a user equipment (also called a user terminal and a mobile station, for example) and optional network elements that provide the interconnection towards the core network. The base station connects the UEs via the so-called radio interface to the network.

Figure 1:
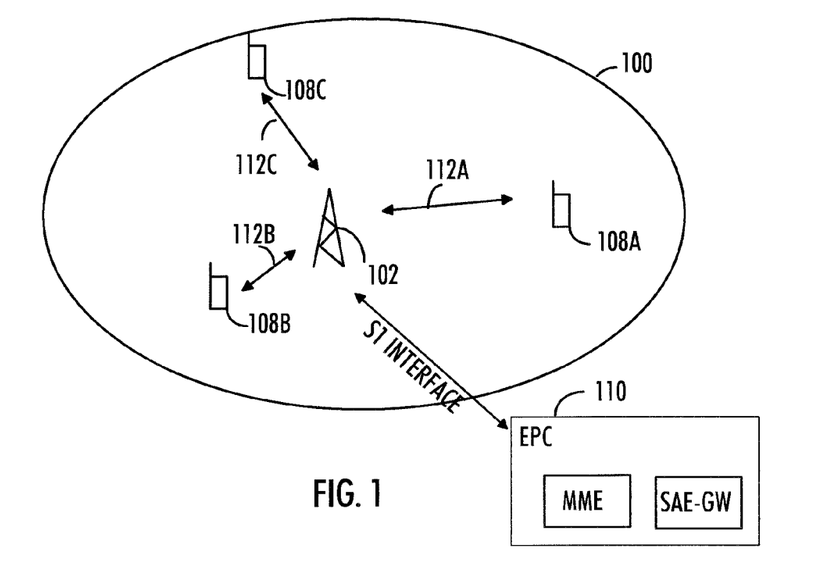
FIG. 1 presents an exemplary radio communication network.

FIG. 1 shows a communication network, according to an embodiment. As explained, the communication network may comprise a base station 102. The base station 102 may provide radio coverage to a cell 100, control radio resource allocation, perform data and control signaling, etc. The cell 100 may be a macrocell, a microcell, or any other type of cell where radio coverage is present. Further, the cell 100 may be of any size or form, depending on the antenna system utilized.

In general, a base station 102 applicable to the embodiments may be configured to provide communication services according to at least one of the following communication protocols: Worldwide Interoperability for Microwave Access (WiMAX), Universal Mobile Telecommunication System (UMTS) based on basic wideband-code division multiple access (W-CDMA), high-speed packet access (HSPA), LTE, and/or LTE-A. The base station 102 may additionally provide the second generation cellular services based on GSM (Global System for Mobile communications) and/or GPRS (General Packet Radio Service). The present embodiments are not, however, limited to these protocols.

The base station 102 may be used in order to provide radio coverage to the cell 100. The base station 102 may be seen as one communication point of the network. The base station 102 may be node B, evolved node B (eNB) as in LTE-A, a radio network controller (RNC), or any other apparatus capable of controlling radio communication and managing radio resources within the cell 100. The base station 102 may also have an effect on mobility management by controlling and analyzing radio signal level measurements performed by a user terminal, carrying out its own measurements and performing handover based on the measurements.

For the sake of simplicity of the description, let us assume that the base station is an eNB. The development of the evolved universal mobile telecommunication's system (UMTS) terrestrial radio access network (E-UTRAN), which is the air interface of the LTE, is concentrated on the eNB 102. All radio functionality is terminated here so that the eNB 102 is the terminating point for all radio related protocols. The E-UTRAN may be configured such that orthogonal frequency division multiple access (OFDMA) is applied in downlink transmission, whereas single carrier frequency division multiple access (SC-FDMA) may be applied in uplink, for example. In the case of multiple eNBs in the communication network, the eNBs may be connected to each other with an X2 interface as specified in the LTE.

The eNB 102 may be further connected via an S1 interface to an evolved packet core (EPC) 110, more specifically to a mobility management entity (MME) and to a system architecture evolution gateway (SAE-GW). The MME is a control plane for controlling functions of non-access stratum signaling, roaming, authentication, tracking area list management, etc., whereas the SAE-GW handles user plane functions including packet routing and forwarding, E-UTRAN idle mode packet buffering, etc. The user plane bypasses the MME plane directly to the SAE-GW. The SAE-GW may comprise two separate gateways: a serving gateway (S-GW) and a packet data network gateway (P-GW). The MME controls the tunneling between the eNB and the S-GW, which serves as a local anchor point for the mobility between different eNBs, for example. The S-GW may relay the data between the eNB and the P-GW, or buffer data packets if needed so as to release them after appropriate tunneling has been established to a corresponding eNB. Further, the MMEs and the SAE-GWs may be pooled so that a set of MMEs and SAE-GWs may be assigned to serve a set of eNBs. This means that an eNB may be connected to multiple MMEs and SAE-GWs, although each user terminal is served by one MME and/or S-GW at a time.

According to an embodiment, the eNB 102 may establish a connection with a user equipment (UE) 108A to 108C such as a mobile user terminal, a palm computer, a user terminal or any other apparatus capable of operating in a mobile communication network. That is, the UE 108A to 108C may perform data communication with the eNB 102 via radio links 112A to 112C, respectively. From now on, reference numeral 108 denotes any of the UEs 108A to 108C.

It may occur that the radio communication link or connection 112A to 112C is interrupted or lost. This may happen due to various different reasons including handover related problems, severe signal fading, etc. These so called radio link failures (RLFs) where the UE 108 looses connection to the connected eNB 102 indicate that a problem has occurred, but the reason or alternatively, the root cause, for the problem is generally not obvious. Therefore, in order to identify and potentially to do corrective actions, a root cause analysis may be needed. The corrective actions may help in avoiding the RLFs in the future or at least in reducing the number of RLFs to occur later on. The corrective actions may be obtained by performing so called radio access parameter tuning according to which the radio access parameters that affect the reliability and robustness of the radio communication link 112A to 112C may be adjusted. By varying the radio access parameters, the success of a set-up of a new communication link 112A to 112C or the robustness of an existing radio link 112A to 112C may be improved. The radio access parameters that may be tuned include handover triggers, such as hysteresis value, absolute signal level, signal quality, time to trigger, averaging windows, and layer 1 filter coefficients, for example. The radio access parameters are applied when a new UE 108 emerges to the cell 100 for which the eNB 102 provides radio coverage, for example. This may take place in handover related situations or when a UE 108 is turned on in a cell 100.

The radio access parameters may be cell-specific. Further, the radio access parameters may be partly even neighboring cell-specific on a peer-to-peer manner. During roll-out and network configuration there generally is a default parameter setting based on network planning data. However, as the actual situation may be different from the network planning data, some connection problems (RLFs, call drops, etc.) might occur. When this occurs, the radio access parameter adaptation and tuning may be obtained initially either manually with drive testing, automatically based on self organizing networks (SON) mechanisms or according to Minimization of Drive Tests (MDT), which is somewhere in between the manual and automatic tuning. However, even though MDT technique provides the first step to reduce the expensive and labor-intensive drive tests which have to be carried out, the manual post-processing and analysis of the measurement data to find the adequate countermeasure in terms parameter adaptation is still costly. Therefore, SON algorithms may be applied to lower the operational expenses and to reduce the problems automatically.

In order to tweak the right parameters and adjust them to the right direction, a rather detailed knowledge of the problem is needed. Generally the root cause analysis is carried out for those connections where RLFs occur, without anticipating the impact of the parameter change to other successful connections in the cell. Thus, the parameter tuning which has impact to all connection in the cell may be based only on those RLF-affected connections regardless of all other connections. The problem is that the tuning of the cell parameters might cause problems to other connections in the cell while helping the problematic ones.

Figure 2:
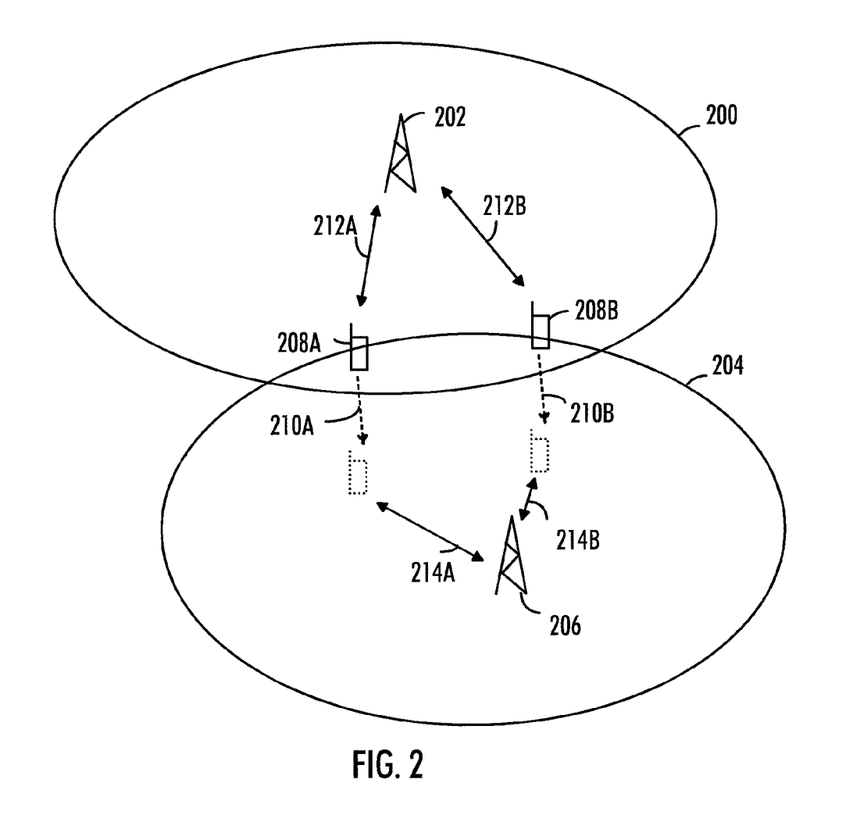
FIG. 2 shows a handover procedure according to an embodiment.

An inter radio access technique (inter-RAT) operation, such as coverage, service or load balancing driven handover between overlaying radio access networks, is shown in FIG. 2. In FIG. 2, there are two eNBs 202 and 206 for providing radio communications to cells 200 and 204, respectively. There are also two UEs 208A and 208B. The initial serving eNB 202 (source eNB) provides radio communication links 212A and 212B to the UEs 208A and 208B, respectively. Let us assume that these UEs 208A and 208B are moving towards the radio coverage area of cell 204, as shown with dashed arrows 210A and 210B, respectively. When the UEs 208A and 208B are in the edge of the two cells 200 and 204, the UEs 208A and 208B may inform the eNB 202 that a handover may be needed (alternatively, the eNB 202 may make this decision based on received signal strengths from the UEs 208A and 208B). Consequently, the eNBs 202 and 206 may transfer information related to the handover via the X2 interface. As a result of the handover, the communication links 212A and 212B may be released, and new communication links 214A and 214B between the eNB 206 and the UEs 208A and 208B, respectively, may be set up.

In an embodiment, a network element obtains first predetermined characteristics related to users 208 who experience a radio link failure. The network element performing the tuning may be the eNB 202, 206, another base station or a further network element, such as a centralized unit other than a base station.

Let us assume that the radio link 214A is successfully set-up and it can start communicating with the eNB 206. Let us further assume that the UE 214B fails to be set-up or fails shortly after being set-up. Thus, the UE 208B experiences a radio link failure. As a consequence, the root cause analysis may be based on information (first predetermined characteristics) collected from the UE 208B who has suffered from the RLF, that is, from the UEs 208B whose radio link has been lost for some reason. The UE 208B may know that certain characteristics need to be reported to the eNB 202. This may be preconfigured to the UE 208B or it may be reported to the UE 208B by the eNB 202 via a downlink control channel, for example. In this way, the network (for example, the eNB 202) obtains the required parameters (the first predetermined characteristics) from the UE 208B. The data may include channel quality information (CQI), signal strength, for example.

The root cause analysis may also be based on the following information: identification of the eNB which is connected to the UE 208B when the RLF occurred, status of the handover if it has been already initiated, and neighbor measurements collected by the UE 208B before the RLF occurred.

In an embodiment, in addition to the first predetermined characteristics obtained from the UE 208B, the eNB 202 (or some other network element) obtains second predetermined characteristics related to the users (for example the UE 208A) who are according to a predetermined rule prone to a radio link failure. Thus, the information related to the user 208A who has not suffered from or experienced the RLF is also obtained.

As a result, the eNB 202 (or other network element) may determine, based on the obtained second predetermined characteristics in addition to the obtained first predetermined characteristics, whether radio access parameter tuning is to be performed or not. Thus, the solution to optimize the radio access parameters in order to reduce the RLF rate applies the information from the successful users in addition to the information gathered/collected from the RLF triggered measurements. This is advantageous so that with this additional information the problematic connections (RLFs) in the cell are reduced without harming other connections which have not suffered from the RLF.

In an embodiment, the first and the second predetermined characteristics comprise at least one of the following or a combination of at least two of the following: link quality of the user in an uplink, link quality of the user in a downlink, signal strength of the user in the uplink, signal strength of the user in the downlink, velocity of the user, direction of movement of the user, time advance information of the user, and time interval between trigger events. The trigger event may be a handover trigger event, so basically the time between two handover triggers, for example.

The information, that is provided to the element performing the radio access parameter tuning, indicate the quality of the channel between the eNB 202 or 206 and the UE in question. It may comprise parameters (characteristics) that relate to the UE's 208A to 208B ability to communicate with the serving eNB 202/206. It may further comprise direction of arrival (DoA) or direction of departure (DoD) of the signal (including azimuth and/or elevation direction(s)), polarization information of the signal, polarization information of the UE's antenna(s), Rician or Rayleigh fading of the signal, path loss values, etc.

For example, in a handover related situation, the parameters that may be transmitted as part of the first and/or second predetermined characteristics may comprise handover parameters, which are used and which can be set by the network. These include hysteresis, for example. If, for example, the signal strength received by the UE 208A and/or 208B from an adjacent cell's 204 base station 206 exceeds that of the base station 202 to which it is currently connected plus the constant hysteresis value, then a handoff occurs to the adjacent cell's base station 206. By adjusting the hysteresis value, the point when the handoff occurs may be changed.

In an embodiment, the first and second predetermined characteristics provide information related to the same parameters. That is, the UEs that have experienced RLF and the users that are prone to the RLF according to the predetermined rule provide information related to same parameters. The information comprised in the first predetermined characteristics may be related to signal strength and to the velocity of the UE, whereas the information comprised in the second predetermined characteristics may also be related to signal strength and velocity of the UE, for example.

In another embodiment, the information comprised in the first predetermined characteristics and in the second predetermined characteristics does not comprise the information of the same parameters. That is, the content is different in terms of parameters provided. The information comprised in the first predetermined characteristics may be related to signal strength, whereas the information comprised in the second predetermined characteristics may be related to signal strength and velocity or only to velocity, for example. This is advantageous so that the transmitted characteristics may be determined separately for each group of users (one group for providing the first predetermined characteristics and another group for providing the second predetermined characteristics). This way only the important parameters from each group may be obtained and the signaling overhead is reduced.

The eNB 202 may, according to an embodiment, obtain information of the number of failed radio links and the number of successful radio links. For example, there may be two failed radio links and 20 successful ones. The eNB 202 may then refrain from the radio access parameter tuning when the number of successful radio links applying certain characteristics is above a certain threshold and the number of failed radio links applying the same characteristics is below another certain threshold. The predetermined thresholds may be preconfigured or determined dynamically. Thus, by doing analysis of the situations with radio link failure and comparing to users with same characteristics, it is possible to evaluate whether any network tuning or reconfiguration should take place. For instance, in case it is detected that RLF occurs with some given conditions, the analysis may be undertaken for similar conditions. In case there are a number of handovers that are successful with these parameters, the eNB 202 may refrain from doing the parameter tuning, as the potential harm might be larger than the potential advantage. That is, the fact that a few radio connections would be saved does not compensate the risk that many more radio connections may be lost. If, on the other hand, only few successful handovers are experienced, the eNB 202 may trigger a retuning/reconfiguration action in order to mitigate the problem.

In another embodiment, the eNB 202 may perform the radio access parameter tuning based on the collected second characteristics in addition to the obtained first predetermined characteristics when the determination result is such that the radio access parameter is to be performed. Thus, the parameter tuning takes the successful users into account as well, not only the users suffering from RLFs.

In an embodiment, the eNB 202 after having determined that the radio access parameter tuning is needed, may further determine, based on the obtained second predetermined characteristics in addition to the obtained first predetermined characteristics, the at least one radio access parameter which at least partly causes the radio link failure. Thus the eNB 202 may determine which of the traced parameters is/are the one(s) causing the RLF to occur. This may be possible by observing, for example three different parameters A, B and C. In case it is determined that certain UEs such as the UE 208B applying all the three parameters within certain limits experienced a radio link failure of the link 214B but many other UEs such as the UE 208A having successful connections 214A and applying the parameters A and B within the same limits as the UE 208B but the parameter C with different value than the UE 208B, the eNB 202 may determine that the parameter C is the one at least partly causing the RLF to occur in the link 214B. As a consequence, the eNB 202 may tune only the at least one radio access parameter (parameter C, for example) which is determined as at least partly causing the radio link failure. This is advantageous so that only those parameters are adjusted which may cause the RLF, not those parameters which do not affect the RLF. Without having the knowledge from the users with successful connections, the eNB 202 might tune all parameters A, B and C, thereby potentially causing harm to the successful users.

The users that are prone to RLF and from which measurement data and traces (as the second predetermined characteristics) are obtained, may be determined on the basis of a predetermined rule. That is, each user 208A and 208B that fulfills the predetermined rule (i.e., the rule is met) is among those users 208A to 208B from which the second predetermined characteristics, also known as second predetermined parameters, are collected. The UE 208A and 208B may know the predetermined rule as information that is preconfigured to the UE 208A to 208B, or the eNB 202/206 may inform the UE 208A to 208B what the rule is or when to collect the second predetermined characteristics. The UE 208A and 208B may collect the parameters by performing radio signal measurements, by analyzing movement vector in terms of direction and/or velocity, etc.

In an embodiment, the predetermined rule is such that the second predetermined characteristics are obtained from each connected 208A to 208B user in the cell 200 or 204. That is, the eNB 202 may inform the UEs 208A and 208B that they need to provide the eNB 202 with information related to the second predetermined parameters. Alternatively, the eNB 206 may make such as a request. Alternatively, the UEs 208A to 208B may know without any request that they need to provide information related to the second predetermined parameters to the serving eNB 202 or 206. The UEs 208A to 208B may provide the information at a certain point of time, such as at predetermined intervals, for example.

In an embodiment, the predetermined rule is such that the second predetermined characteristics are obtained from users who experience similar radio conditions and/or have similar measurements results as the users who have experienced the RLF. The measurement results may indicate the signal quality received by the user, for example.

In an embodiment, the predetermined rule according to which a user is prone to the radio link failure is at least one of the following or a combination of at least two of the following: link quality of the user in an uplink below a certain threshold, a link quality of the user in a downlink below a certain threshold, signal strength of the user in the uplink below a certain threshold, signal strength of the user in the downlink below a certain threshold, velocity of the user above a certain threshold, a predetermined direction of movement of the user, and time advance information of the user exceeding a certain threshold. The UE speed may be one parameter indicating variability in the channel conditions. The time advance information indicates the user's location in the cell.

The one or more thresholds may be preconfigured to the UE 208A to 208B or informed to the UE 208A to 208B by the serving eNB 202 or 206. If the received signal strength in the downlink channel is below a predetermined threshold, the UE knows that information related to the second predetermined characteristics is now needed, as that user is according to the predetermined rule, prone to RLF. Thus, in an embodiment, if at least one of the above criteria is fulfilled, information is collected (either at the terminal- or at the eNB-side) and possibly forwarded to the network element performing the radio access parameter tuning.

In an embodiment, the eNB 202 or 206 may inform a UE which predetermined characteristics are to be obtained and the predetermined rule according to which the obtaining takes place, when the user terminal provides at least part of the characteristics to be obtained. In other words, the eNB may tell the UE that which parameters are to be reported, when the UE provides part or all of the first and/or second predetermined characteristics. In addition, the eNB may tell the UE when the UE needs to provide the second predetermined information by letting the UE know what the predetermined rule, according to which the user terminal is considered as prone to RLF, is.

In an embodiment, only the users related to a handover procedure are taken into account when obtaining the second predetermined characteristics. That is, even if a static user not part of a handover process measures a signal strength below a certain threshold, the user does not transmit any second predetermined characteristics to the serving eNB (or if does transmit, the eNB may discard the information). If an UE is in the middle of handover procedure, the UE 208A to 208B may start providing information related to the second predetermined characteristics to the serving eNB. This may take place only when the UE 208A to 208B is performing a handover and one of the thresholds as presented above is exceeded. In another embodiment, all the users in the handover procedure are taken into account and information from them is gathered regardless of whether or not any of the thresholds are exceeded.

Thus, the check whether the user's certain parameter has exceeded the corresponding threshold, may be performed at a predetermined point in time. When the handover situation is considered, that is, only handover related users are considered, the check whether the user's certain parameter has exceeded the corresponding threshold is conducted at the handover phase.

This way, the predetermined rule determines whether the user provides information related to the second predetermined characteristics or not. This is advantageous so that the amount of information may be limited so that information is gathered only from at least one certain group of users.

Figure 3:
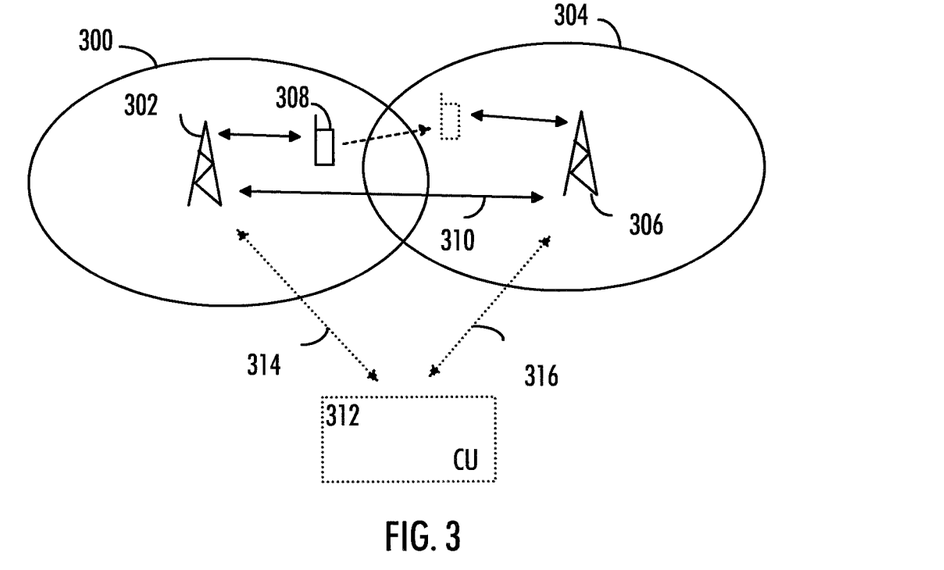
FIG. 3 shows according to an embodiment where the radio access parameter tuning takes place.

With regards to FIG. 3, it is shown where the tuning of the radio access parameters may be performed. Let us assume that UE 308 moves from the radio coverage area 300 of eNB 302 to the radio coverage area 304 of eNB 306, as shown with a dashed arrow. This may result in a handover to take place.

In an embodiment, the eNB 302, prior to the handover, collects the first and/or second predetermined parameters from the UE 308. The eNB 302 then communicates the obtained first and second characteristics to a further network element for the determination of whether radio access parameter tuning is to be performed or not. The further network element may be a second eNB 306 or some other eNB in the radio communication network. As shown in FIG. 3, the eNB 302 may communicate the data to the eNB 306 via the X2 interface, as shown with solid arrow 310. In this case the target eNB 306 of the handover may perform the radio access parameter tuning. This may be called a de-centralized option. This is advantageous, since it is the radio access parameters applied by the target eNB 306 that may have caused the radio link failure to occur.

Alternatively, the source eNB 302 and/or the target eNB 306 of the handover may transmit the data to a centralized unit (CU) 312, such as an operation and maintenance (OAM), steering the parameter tuning in the radio communication network, as shown with dotted lines 314 and 316 respectively. This may be called a centralized option. The central unit 312 may then perform the radio access parameter tuning that affects the radio link failure(s) to occur in the handover between the two eNBs 302 and 306.

The centralized unit or the network element performing the radio access parameter tuning may have an option to either reconfigure the data amounts to be collect in terms of time duration of collection and/or in terms of additional content to be collected. The network element may also add a predetermined rule for triggering the data collection.

The CU 312 may in an embodiment request more characteristics to be obtained from a network element other than the network element which performed the obtaining of the characteristics. That is, in case the eNB 302 collected the first and/or second predetermined characteristics, the CU 312 may request the eNB 306 to provide further parameters (for example, measurement reports) to the CU 312. This is advantageous so that the CU 312 obtains all the required information for performing the parameter tuning. Some information may not be obtained from the source eNB 302 but only from the target eNB 306. Further, signaling overhead is reduced when the CU 312 does not have to request the additional data via the eNB 302 but directly from the eNB 306.

Even though the embodiments have been mainly explained in a handover situation, the embodiments can be applied to any situation where RLF may take place. Thus, the case where a (static or mobile) user experiences an RLF without any handover process being present, the embodiments may aid in performing such parameter tuning which takes also the not-RLF-affected users into account.

Figure 4:
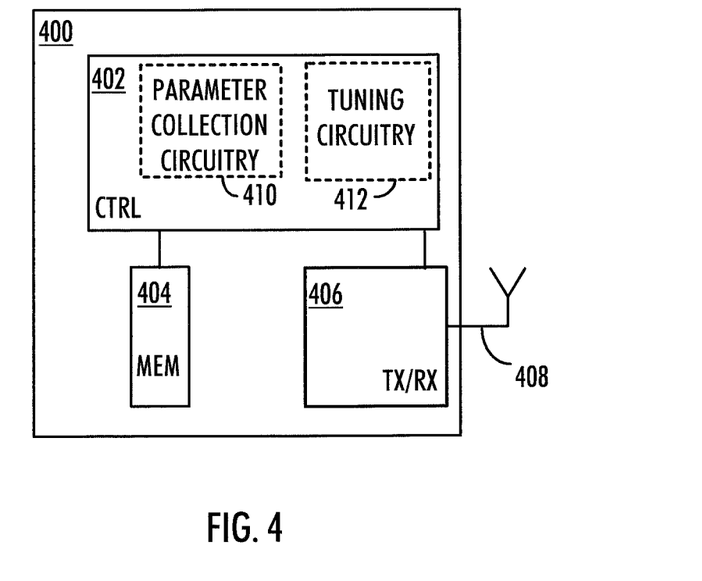
FIG. 4 illustrates an apparatus for the radio access parameter tuning.

A very general architecture of an apparatus according to an embodiment is shown in FIG. 4. FIG. 4 shows only the elements and functional entities required for understanding the apparatus according to an embodiment. Other components have been omitted for reasons of simplicity. The implementation of the elements and functional entities may vary from that shown in FIG. 4. The connections shown in FIG. 4 are logical connections, and the actual physical connections may be different. The connections can be direct or indirect and there can merely be a functional relationship between components. It is apparent to a person skilled in the art that the apparatus may also comprise other functions and structures. The apparatus 400 for performing the radio access parameter tuning may comprise a processor 402. The processor 402 may be implemented with a separate digital signal processor provided with suitable software embedded on a computer readable medium, or with a separate logic circuit, such as an application specific integrated circuit (ASIC). The processor 402 may comprise an interface, such as computer port, for providing communication capabilities. The processor 402 may be, for example, a dual-core processor or a multiple-core processor. The apparatus 400 may comprise a memory 404 connected to the processor 402. However, memory may also be integrated to the processor 402 and, thus, no memory 404 may be required. The memory 404 may be used to store/buffer the collected first and/or second radio access parameters or any other data before being transmitted.

The apparatus 400 may further comprise a transceiver (TRX) 406. The TRX 406 may further be connected to one or more antennas 408 enabling connection to and from an air interface. The TRX 406 may be used in transmitting the first and second predetermined characteristics to a network element performing the radio access parameter tuning. The TRX may also be used in receiving collected parameters from any user equipment connected to the apparatus 400. The TRX 406 may receive requests from further network elements.

The processor 402 may comprise a parameter collection circuitry 410 for obtaining of the first and/or second predetermined characteristics. The apparatus 400 may itself collect the first and/or second predetermined parameters or the apparatus may obtain the parameters from other network element, such as from any UE connected to the apparatus. The parameter collection circuitry 410 may also perform task relating to the determination of the rule according to which a UE is considered as prone to RLF, the determination of the parameters to be transmitted to the network element performing the radio access parameter tuning, the determination of the parameters to be applied in the radio access parameter tuning, the determination of which characteristics (parameters) are among the first and/or second predetermined characteristics. The parameter collection circuitry 410 may also be responsible of collecting additional parameters if requested by a further network element.

The processor 402 may comprise a tuning circuitry 412 for performing the radio access parameter tuning. The tuning circuitry 412 may thus determine which parameters need to be optimized by taking into account the second predetermined characteristics in addition to the first predetermined characteristics. Thus, the tuning circuitry may tune only those parameters that need to be tuned, not the other parameters that most likely already have appropriate values. The tuning circuitry 412 may also decide that the tuning is not to be performed at this point (refraining from the radio access parameter tuning). The tuning circuitry 412 may obtain information of the number of failed radio links and the number of successful radio links, for example. The tuning may denote changing the value of at least one specific radio access parameter so that the number of future RLFs is reduced. The tuning circuitry 412 takes the first and the second predetermined parameters into account when performing the tuning.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

Figure 5:
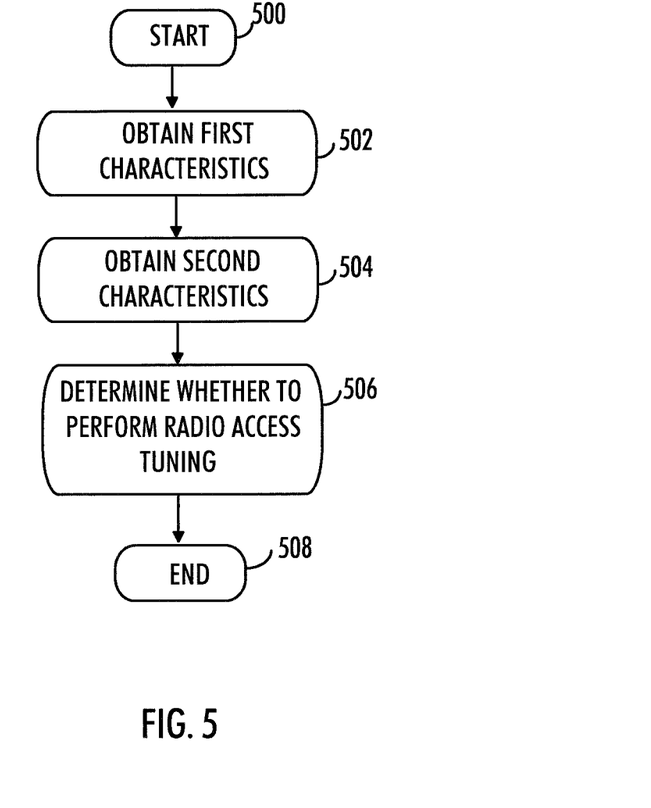
FIG. 5 illustrates a method for the radio access parameter tuning.

FIG. 5 shows a method for radio access tuning. The method starts in step 500. In step 502, the method comprises obtaining first predetermined characteristics related to users who experienced a radio link failure. In step 504, second predetermined characteristics related to the users who are according to a predetermined rule prone to a radio link failure are obtained. In step 506, the method comprises determining, based on the obtained second predetermined characteristics in addition to the obtained first predetermined characteristics, whether radio access parameter tuning is to be performed or not. The method ends in step 508.

The techniques and methods described herein may be implemented by various means. For example, these techniques may be implemented in hardware (one or more devices), firmware (one or more devices), software (one or more modules), or combinations thereof. For a hardware implementation, the apparatus of FIG. 4 may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art. Thus, according to an embodiment, the apparatus for performing the tasks of FIGS. 1 to 5 comprises processing means for obtaining first predetermined characteristics related to users who experienced a radio link failure, processing means for obtaining second predetermined characteristics related to the users who are according to a predetermined rule prone to a radio link failure, and processing means for determining, based on the obtained second predetermined characteristics in addition to the obtained first predetermined characteristics, whether radio access parameter tuning is to be performed or not.

Embodiments of the invention may be implemented as computer programs according to the embodiments. The computer programs comprise instructions for executing a computer process for improving the radio access parameter tuning. The computer program implemented in the apparatus 400 may carry out, but is not limited to, the tasks related to FIGS. 1 to 5.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

The invention claimed is:

1. A method, comprising:
   obtaining first predetermined characteristics related to users who experienced a radio link failure;
   obtaining second predetermined characteristics related to the users who are according to a predetermined rule prone to a radio link failure; and
   determining, based on the obtained second predetermined characteristics in addition to the obtained first predetermined characteristics, whether radio access parameter tuning is to be performed or not.

2. The method of claim 1, wherein the predetermined rule is such that the second predetermined characteristics are obtained from each connected user in a cell.

3. The method of claim 1, wherein the predetermined rule according to which a user is prone to the radio link failure is at least one of the following or a combination of at least two of the following:
   link quality of the user in uplink below a certain threshold,
   a link quality of the user in downlink below a certain threshold,
   signal strength of the user in the uplink below a certain threshold,
   signal strength of the user in the downlink below a certain threshold,
   velocity of the user above a certain threshold,
   a predetermined direction of movement of the user, and
   time advance information of the user exceeding a certain threshold.

4. The method of claim 1, wherein only the users related to a handover procedure are taken into account when obtaining the second predetermined characteristics.

5. The method of claim 1, wherein the first and the second predetermined characteristics comprise characteristics that relate to the ability of a user to communicate with a base station to which it is connected.

6. The method of any of claim 1, the method further comprising:
   communicating the obtained first and second characteristics to a further network element for the determination of whether radio access parameter tuning is to be performed or not.

7. The method of claim 1, the method further comprising:
   requesting more characteristics to be obtained from a network element other than the network element who performed the obtaining of the first and second predetermined characteristics.

8. The method of claim 1, the method further comprising:
   obtaining information of the number of failed radio links and the number of successful radio links; and
   refraining from the radio access parameter tuning when the number of successful radio links applying certain characteristics is above a certain threshold and the number of failed radio links applying the same characteristics is below another certain threshold.

9. The method of claim 1, the method further comprising:
   performing the radio access parameter tuning based on the obtained second predetermined characteristics in addition to the obtained first predetermined characteristics when the determination result is such that the radio access parameter tuning is to be performed.

10. The method of claim 9, the method further comprising:
    determining, based on the obtained second predetermined characteristics in addition to the obtained first predetermined characteristics, at least one radio access parameter which at least partly causes the radio link failure; and
    tuning only the at least one radio access parameter which is determined as at least partly causing the radio link failure.

11. The method of claim 10, the method further comprising:
    informing a user equipment which predetermined characteristics are to be obtained and the predetermined rule according to which the obtaining takes place, when the user equipment provides at least part of the characteristics to be obtained.

12. A computer program product embodied on a non-transitory distribution medium readable by a computer and comprising program instructions which, when loaded into an apparatus, execute the method according to claim 1.

13. An apparatus, comprising:
    at least one processor and at least one memory including a computer program code, wherein the at least one memory and the computer program code are configured, with the at least one processor, to cause the apparatus at least to:
    obtain first predetermined characteristics related to users who experienced a radio link failure;
    obtain second predetermined characteristics related to the users who are according to a predetermined rule prone to a radio link failure; and determine, based on the obtained second predetermined characteristics in addition to the obtained first predetermined characteristics, whether radio access parameter tuning is to be performed or not.

14. The apparatus of claim 13, wherein the predetermined rule is such that the second predetermined characteristics are obtained from each connected user in a cell.

15. The apparatus of claim 13, wherein the predetermined rule according to which a user is prone to the radio link failure is at least one of the following or a combination of at least two of the following:
   link quality of the user in uplink below a certain threshold,
   a link quality of the user in downlink below a certain threshold,
   signal strength of the user in the uplink below a certain threshold,
   signal strength of the user in the downlink below a certain threshold,
   velocity of the user above a certain threshold,
   a predetermined direction of movement of the user, and
   time advance information of the user exceeding a certain threshold.

16. The apparatus of claim 13, wherein only the users related to a handover procedure are taken into account when obtaining the second predetermined characteristics.

17. The apparatus of claim 13, wherein the first and the second predetermined characteristics comprise characteristics that relate to the user's ability to communicate with a base station to which it is connected.

18. The apparatus of claim 13, wherein the apparatus is further caused at least to:
   communicate the obtained first and second characteristics to a further network element for the determination of whether radio access parameter tuning is to be performed or not.

19. The apparatus of claim 13, wherein the apparatus is further caused at least to:
   request more characteristics to be obtained from a network element other than the network element who performed the obtaining of the first and second predetermined characteristics.

20. The apparatus of claim 13, wherein the apparatus is further caused at least to:
   obtain information of the number of failed radio links and the number of successful radio links; and
   refrain from the radio access parameter tuning when the number of successful radio links applying certain characteristics is above a certain threshold and the number of failed radio links applying the same characteristics is below another certain threshold.

21. The apparatus of claim 13, wherein the apparatus is further caused at least to:
   perform the radio access parameter tuning based on the obtained second predetermined characteristics in addition to the obtained first predetermined characteristics when the determination result is such that the radio access parameter tuning is to be performed.

22. The apparatus of claim 21, wherein the apparatus is further caused at least to:
   determine, based on the obtained second predetermined characteristics in addition to the obtained first predetermined characteristics, at least one radio access parameter which at least partly causes the radio link failure; and
   tune only the at least one radio access parameter which is determined as at least partly causing the radio link failure.

23. The apparatus of claim 13, wherein the apparatus is further caused at least to:
   inform a user equipment which predetermined characteristics are to be obtained and the predetermined rule according to which the obtaining takes place, when the user equipment provides at least part of the characteristics to be obtained.

24. An apparatus, comprising:
   processing means for obtaining first predetermined characteristics related to users who experienced a radio link failure;
   processing means for obtaining second predetermined characteristics related to the users who are according to a predetermined rule prone to a radio link failure; and
   processing means for determining, based on the obtained second predetermined characteristics in addition to the obtained first predetermined characteristics, whether radio access parameter tuning is to be performed or not.

* * * * *